United States Patent [19]

Ikemori

[11] Patent Number: 4,468,099
[45] Date of Patent: Aug. 28, 1984

[54] TELEPHOTO OBJECTIVE

[75] Inventor: Keiji Ikemori, Kanagawa, Japan

[73] Assignee: Canon Kabushiki Kaisha, Tokyo, Japan

[21] Appl. No.: 308,565

[22] Filed: Oct. 5, 1981

[30] Foreign Application Priority Data

Oct. 9, 1980 [JP] Japan .............................. 55-141190
Nov. 1, 1980 [JP] Japan .............................. 55-154019

[51] Int. Cl.$^3$ ......................... G02B 9/64; G02B 13/02
[52] U.S. Cl. ................................................... 350/454
[58] Field of Search ........................................ 350/454

[56] References Cited

U.S. PATENT DOCUMENTS

4,293,197  10/1981  Kobayashi et al. ................. 350/454

Primary Examiner—John K. Corbin
Assistant Examiner—Rebecca D. Gass
Attorney, Agent, or Firm—Toren, McGeady and Stanger

[57] ABSTRACT

Disclosed is a compact high-performance telephoto objective having two groups of which the front group is of positive power and the rear group is of negative power. The front lens group having, from front to rear, three lenses of positive power and one lens of negative power, and the rear lens group having, from front to rear, a lens of positive power and a cemented lens of negative power followed by at least one cemented lens of negative power.

9 Claims, 42 Drawing Figures

TELEPHOTO OBJECTIVE

BACKGROUND OF THE INVENTION

1. Field of the Invention

This invention relates to telephoto objectives, and more particularly to compact high-performance photographic objectives of long focal length.

2. Description of the Prior Art

Aberrations affecting the imaging performance of telephoto objectives are the well known chromatic aberrations and curvature of field. Of these the longitudinal chromatic aberration though increasing proportionally with increase in the focal length can be corrected to an extremely small quantity by using fluorite, or special low-dispersion glass in the positive lens of the front group of the lens system. Also the field curvature can be well corrected to some degree by the choice of reasonable glasses (those of low refractive index in the positive lens, and of high refractive index in the negative lens), provided the size of the lens system is not reduced much. But, when the lens system is made so compact that the telephoto ratio lies between 0.6 and 0.7 as in specific embodiments of the present invention, it has to allow for deterioration of other aberrations. In particular, spherical aberration and coma and further chromatic aberrations, despite good correction of field curvature.

In the art of telephoto objectives, it has been known to construct the front group of four lenses for the purpose of achieving an increase in the imaging performance, as, for example, U.S. Pat. No. 4,176,913 and Japanese Pat. 46-14423.

SUMMARY OF THE INVENTION

An object of the present invention is to provide a telephoto objective of reduced size while permitting good correction of the various aberrations which would otherwise deteriorate badly when the objective is made more compact.

In the embodiments to be described later, not only the longitudinal chromatic aberration and field curvature, but also color coma, color astigmatism and lateral chromatic aberration are well corrected, regardless of the fact that the compactness is improved to the extremity of 0.59 in the telephoto ratio.

The lens system of the present invention has, as its general configuration, front and rear groups constituting a telephoto objective. The front group has, from front to rear, a first lens of positive power, a second lens of positive power with its convex side towards the rear, a third lens of negative power with its concave side towards the front, and a fourth lens of positive power with its convex side towards the front. The rear group has, from front to rear, a fifth lens of positive power with its convex side towards the front, a sixth lens of negative power and a seventh lens of positive power, the last two of which are cemented together to form a first doublet of negative power. Appropriate conditions are given for certain designated features of the above-described various lenses. If each lens is so designed that the features fall within the conditions, the object of the present invention is accomplished.

BRIEF DESCRIPTION OF THE DRAWINGS

FIGS. 2-a to f, 4-a to f, 6-a to f, 8-a to f, 10-a to f, and 12-a to f are aberrational curves of the objectives of FIGS. 1, 3, 5, 7, 9 and 11 respectively.

DETAILED DESCRIPTION OF THE PREFERRED EMBODIMENTS

The telephoto objective of the present invention comprises, from front to rear in a direction in which light enters from the object side, a front lens group of positive refractive power and a rear lens group of negative refractive power, the front group having, from front to rear, a positive first lens, a positive second lens of convex curvature towards the rear, a negative third lens of concave curvature towards the front and a positive fourth lens of convex curvature towards the front, and being characterized by fulfilling the following relationships:

$$1.6 < \frac{f1}{f2} < 4.0 \quad (1)$$

$$10 < \nu2 - \nu1 < 30 \quad (2)$$

$$0.1 < \frac{D4}{Dl} < 0.4 \quad (3)$$

where f1 and f2 are the focal lengths of the first and second lenses, $\nu1$ and $\nu2$ are the Abbe numbers of the glasses of which the first and second lenses are made, Dl is the axial length of the front group, and D4 is the axial air separation between the second and third lenses.

The refractive power of the rear surface of the first lens is made stronger than that of the front surface thereof.

It will be appreciated that one of the features of the present invention resides in that the front group is divided into four members of positive, positive, negative and positive powers, and the first member is made somewhat weaker in power relative to the second member while a glass of relatively high dispersion is selected for use therein and the air separation between the second and third lens members are left widened. Another feature, that the first lens member turns its more powerful side toward the rear, facilitates good correction of color coma and color astigmatism without suffering from a difficult design.

The significance of the limits of a range of each factor in the conditions is as follows.

At first, by restricting the power and dispersion of the first lens makes it possible to achieve a very good correction of color coma, color astigmatism and lateral chromatic aberration while causing little deterioration of longitudinal chromatic aberration. This is in conditions (1) and (2). When the lower limit of condition (1) or the upper limit of condition (2) is exceeded, the above-described off-axis color aberrations are well corrected, or over-corrected, and the on-axis color aberrations deteriorated rapidly. When above the upper limit of condition (1), or below the lower limit of condition (2), no effect is produced on correction of the above-described off-axis dependent color aberrations (color coma, color astigmatism and lateral chromatic aberration) is produced.

Condition (3) serves for good correction of spherical aberration and astigmatism while still permitting the possibility of achieving a further minimization of the size of the lens system. Below the lower limit, over-correction of spherical aberration and astigmatism results, and the total length of the lens system becomes long.

This makes it difficult to realize a valuable increase in the imaging performance and a significant reduction of the size. Above the upper limit, not only under-correction of spherical aberration and astigmatism results, but also the color coma, color astigmatism and lateral chromatic aberration are objectionably increased so that the balanced aberrations as a whole are broken and the possibility of increasing the grade of imaging performance is no longer achieved.

Another feature is that the front group is provided with a diverging air lens between the second and third lens members and with a converging air lens between the third and fourth lens members to facilitate a further improvement of the aberrational correction.

In the present invention, though the designation of the certain features or conditions to the front group suffices in affording a telephoto objective at which The present invention aims, it is also possible to otherwise accomplish the object of the present invention by giving appropriate conditions for the constituent lenses of the rear group.

The rear group of the telephoto objective of the invention comprises, from front to rear, a fifth lens of positive refractive power with its convex side towards the front, a sixth lens of negative refractive power and a seventh lens of positive refractive power, the sixth and seventh lenses cemented together at their adjoining surfaces to form a cemented first lens of negative refractive power, and the rear group being characterized by fulfilling the following relationships:

$$\phi R \leq \phi A < 0 \tag{4}$$

$$3 < \frac{\phi 5}{|\phi A|} < 10 \tag{5}$$

$$4.5 < \frac{|\phi 62|}{|\phi A|} < 12 \tag{6}$$

$$0.2 < n6 - n5 < 0.4 \tag{7}$$

$$0.2 < n6 - n7 < 0.4 \tag{8}$$

where ρR is the refractive power of the above-described rear group, ρA is the overall refractive power of the above-described fifth lens and the above-described first cemented lens, ρ5 and ρ62 are the refractive powers of the above-described fith lens and first cemented lens respectively, and n5, n6 and n7 are the refractive indices of the glasses of the fifth, sixth and seventh lenses.

To achieve a further improved telephoto objective, preferably the fifth lens and the first cemented lens each are of the meniscus form convex towards the front, the cemented surface of the first cemented lens is convex towards the front and is of negative refractive power, and the air separation between the fifth lens and the first cemented lens has an air lens of positive refractive power.

In general, telephoto objectives may be considered as comprising front and rear groups, of which the front group has a positive power and the rear group has a negative power, thus forming the so-called telephoto type. Then, to make the lens system compact, the powers of the front and rear groups must be strengthened with the shortening of the interval between their principal points. With this alone, however, as has been mentioned above, the state of correction of the image aberrations deteriorates badly. Therefore, the present invention, while preserving a somewhat strengthening of the powers of the front and rear groups, has to impart to the rear group a form similar to that described above, or a combination of positive and negative lens members in this order from the front, that is, a telephoto type form, thus achieving an increase in the compactness. At this time, in order to allow for as small as increase of the spherical aberration and coma as possible, it is desirable to configure these positive and negative lenses to meniscus shapes of forward convexity. As the positive and negative lenses produce over-corrected spherical aberration, this can be advantageously removed by giving the air lens between the both lenses a converging action. On the other hand, deterioration of the field curvature is prevented by constructing the negative lens member from a negative lens element of a high refractive index and a positive lens element of low refractive index in cemented form. In examples of specific objectives of the invention, the front group consists of a positive lens element, a biconvex lens element, a negative lens element of convex curvature towards the front and a positive lens element of convex curvature towards the front.

Condition (4) represents the combined power of the above-described fifth singlet and first doublet which is negative, and also represents that even when there are additional members that follow the doublet, the total power with the inclusion of these additional members is negative too. This can simplify the aberrational problem. This also allows, instead of moving the lens system as a whole to effect focusing, of imparting independent focusing movement into one of the negative lens members which is arranged at the rearmost position in the rear group. In this case, this condition is of great importance in stabilizing the aberrational correction during the focusing range.

Conditions (5) and (6) serve for restricting the powers of the fifth singlet and first doublet to be somewhat strong for the purpose of well correcting the field curvature. When, below the lower limits, the power of each lens member becomes too weak to effect sufficient correction of the field curvature. When, above the upper limits, though a good result is effected with regard to the correction of field curvature, other aberrations particularly regarding spherical aberration become difficult to correct by convenient techniques.

Conditions (7) and (8) cooperate with conditions (5) and (6) to well correct the field curvature. The positive lens is made of a low refractive index glass, and the negative lens of a high refractive index glass. When below the lower limits, insufficient correction of the field curvature results. When, above the upper limits, it becomes difficult to choose an optimum combination of glasses from among the presently available glasses so as to solve the aberrational problem including chromatic aberration correction.

As another feature of the invention, in order to further improve the imaging performance, use is made of at least one cemented lens C of negative refractive power consisting of a lens element A of positive refractive power and a lens element B of negative refractive power in the rear of the cemented 1st lens. Preferably the complete rear group fulfills the following relationships:

$$0 < \nu 5 - \nu 6 < 12, \tag{9}$$

$$0 < \nu 7 - \nu 6 < 12, \tag{10}$$

$$5 < \nu B < \nu A < 30 \tag{11}$$

where $\nu_5$, $\nu_6$, $\nu_7$, $\nu_A$ and $\nu_B$ are the Abbe numbers of the fifth, sixth, seventh and lenses A and B respectively.

It is preferred from the standpoint of the aberration correction that the cemented lens C is convex toward the front.

It should be pointed out here that where two cemented lenses C are provided, the rear one may be made axially movable for focusing with an advantage that the focusing mechanism is easily operable.

Conditions (9) and (10) represent a range of presently available glasses for making it possible to correct the field curvature of these lenses and to improve the secondary spectrum. When the upper and lower limits are exceeded, no combination of glasses capable of good correction of aberrations can be found out.

The use of at least one cemented lens C of negative power in the rear of the cemented first lens in the rear group allows for control of power distribution over the rear lens group. In this connection it is further preferable that there be provided two or more cemented lens C over which the power of the otherwise singly provided cemented lens C is distributed. This first cemented lens C is preferably also of the meniscus form of forward convexity likewise the preceding cemented 1st lens. It is also noted that the order of the constituent elements in the cemented lens may be either the negative followed by the positive, or the positive followed by the negative.

And the use of this cemented lens C or lenses under condition (11) makes it possible to correct the longitudinal chromatic aberration (g line) which is apt to be over-corrected by the forwardly positioned lenses. When the upper limit is exceeded, the correcting action is too strong to avoid a change of the longitudinal chromatic aberration from the over-correction to the under-correction. When the lower limit is exceeded, insufficient compensation results.

Six examples of specific objectives of the invention may be constructed in accordance with the numerical data given in the following respective tables for the radii of curvature, R, the axial thicknesses and separations, D, the refractive indices, N, and the Abbe numbers, $\nu$. These objectives have an angular field of 2.137° with F-number of 5.7 and a telephoto ratio of 0.69, and an angular field of 2.48° with F-number of 8 and a telephoto ratio of 0.59, and are found to have a super telephoto effect with the advantage of extreme compactness, while nevertheless the various aberrations are well corrected for high grade imaging performance.

Figure 1:
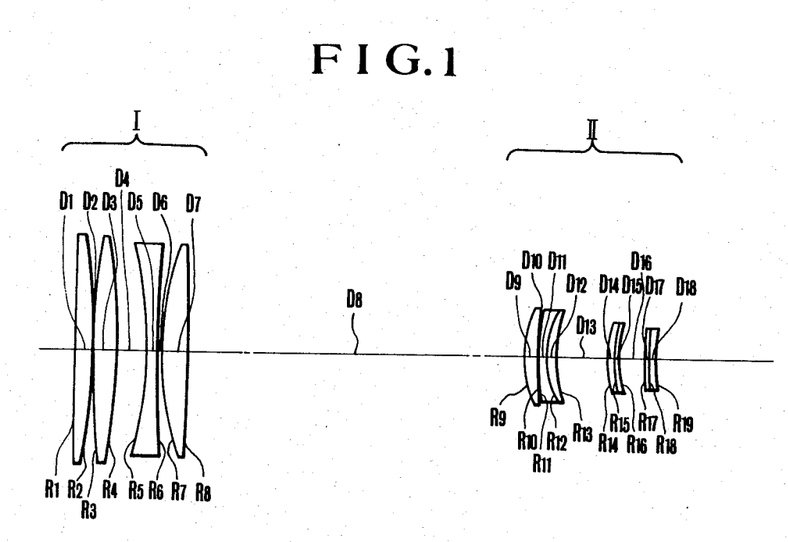
FIGS. 1, 3, 5, 7, 9 and 11 are lens block diagrams of embodiments 1 to 6 of the invention respectively.
Figures 2A, 2B, 2C:
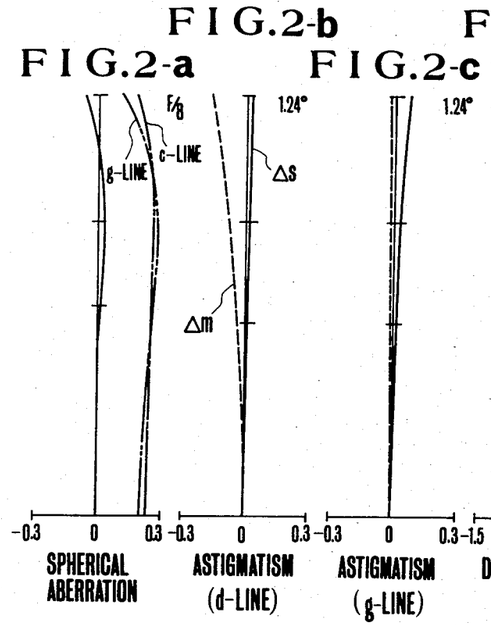
Figures 2D, 2E:
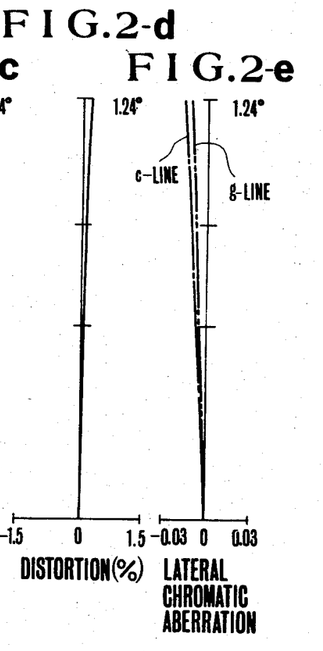
Figure 2F:
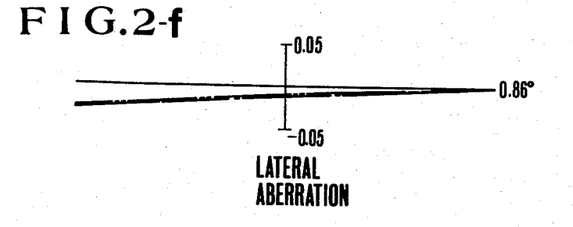

EXAMPLE 1
(FIGS. 1 and 2)

Focal Length f = 1000   F-number: F/8
Image Angle 2ω = 2.48°   Telephoto Ratio: RT = 0.59

| | | | | | | |
|---|---|---|---|---|---|---|
| R1 | ∞ | D1 | 10.213 | N1 | 1.51633 $\nu$1 | 64.1 |
| R2 | −529.959 | D2 | 0.851 | | | |
| R3 | 690.256 | D3 | 13.618 | N2 | 1.497 $\nu$2 | 81.6 |
| R4 | −302.432 | D4 | 17.405 | | | |
| R5 | −255.051 | D5 | 7.234 | N3 | 1.7859 $\nu$3 | 44.2 |
| R6 | 1922.821 | D6 | 2.775 | | | |
| R7 | 230.905 | D7 | 13.618 | N4 | 1.497 $\nu$4 | 81.6 |
| R8 | −1337.6 | D8 | 196.76 | | | |
| R9 | 67.137 | D9 | 6.724 | N5 | 1.53256 $\nu$5 | 45.9 |
| R10 | 281.104 | D10 | 1.549 | | | |
| R11 | 196.176 | D11 | 3.404 | N6 | 1.883 $\nu$6 | 40.8 |
| R12 | 51.499 | D12 | 6.383 | N7 | 1.53256 $\nu$7 | 45.9 |
| R13 | 88.661 | D13 | 30.649 | | | |
| R14 | 94.034 | D14 | 3.404 | N8 | 1.76182 $\nu$8 | 26.5 |
| R15 | 168.63 | D15 | 2.621 | N9 | 1.734 $\nu$9 | 51.5 |
| R16 | 81.609 | D16 | 4.818 | | | |
| R17 | 271.432 | D17 | 3.404 | N10 | 1.76182 $\nu$10 | 26.5 |
| R18 | −3408.344 | D18 | 2.289 | N11 | 1.734 $\nu$11 | 51.5 |
| R19 | 119.561 | | | | | |

Front Group: R1 to R8    $f_1/f_2 = 2.415$
Rear Group: R9 to R19    $\nu_2 - \nu_1 = 17.5$
                         $D_4/D_1 = 0.265$

Figure 3:
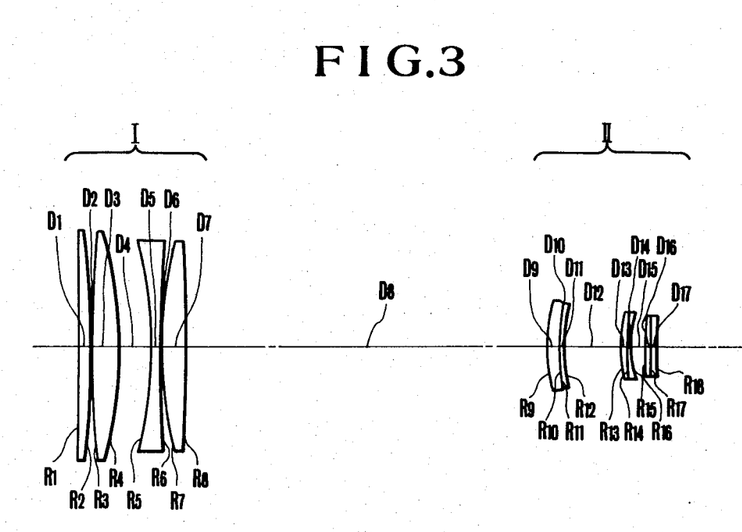
Figures 4A, 4B, 4C, 4D, 4E, 4F:
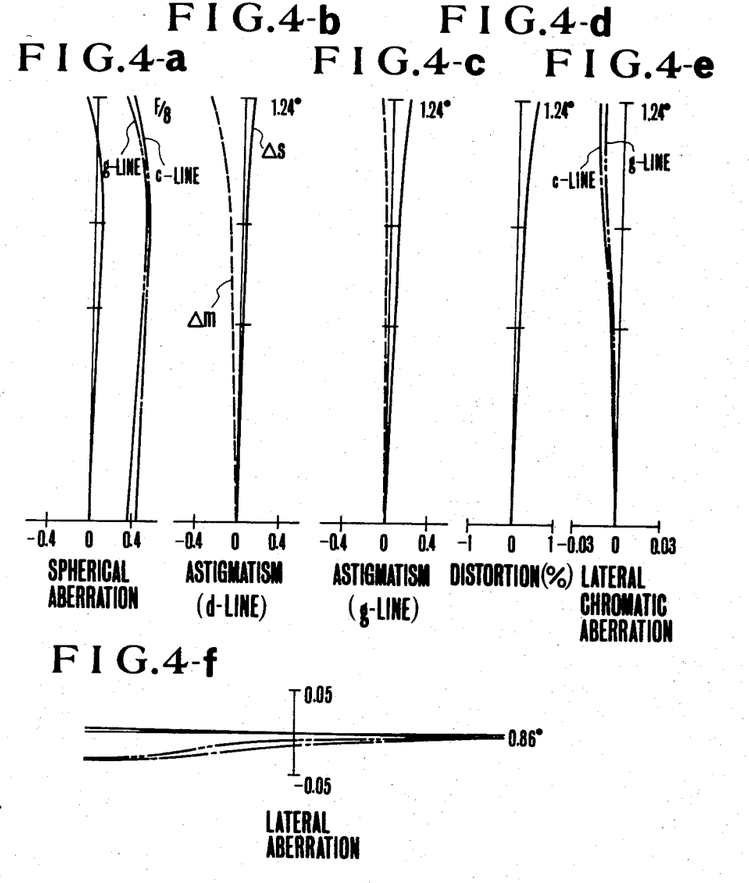

EXAMPLE 2
(FIGS. 3 and 4)

Focal Length f = 1000   F-number: F/8
Image Angle 2ω = 2.48°   Telephoto ratio RT = 0.59

| | | | | | | |
|---|---|---|---|---|---|---|
| R1 | ∞ | D1 | 6.8 | N1 | 1.51633 $\nu$1 | 64.1 |
| R2 | −599.196 | D2 | 0.85 | | | |
| R3 | 644.179 | D3 | 14.46 | N2 | 1.497 $\nu$2 | 81.6 |
| R4 | −293.495 | D4 | 20.49 | | | |
| R5 | −241.622 | D5 | 5.43 | N3 | 1.7859 $\nu$3 | 44.2 |
| R6 | 1937.929 | D6 | 0.44 | | | |
| R7 | 239.196 | D7 | 14.46 | N4 | 1.497 $\nu$4 | 81.6 |
| R8 | −803.059 | D8 | 209.98 | | | |
| R9 | 106.229 | D9 | 6.8 | N5 | 1.58144 $\nu$5 | 40.7 |
| R10 | 344.279 | D10 | 0.82 | | | |
| R11 | 268.06 | D11 | 2.55 | N6 | 1.883 $\nu$6 | 40.8 |
| R12 | 106.946 | D12 | 32.68 | | | |
| R13 | 90.794 | D13 | 3.4 | N7 | 1.7552 $\nu$7 | 27.5 |
| R14 | 132.467 | D14 | 2.55 | N8 | 1.713 $\nu$8 | 53.8 |
| R15 | 71.492 | D15 | 8.54 | | | |
| R16 | 325.624 | D16 | 3.4 | N9 | 1.7552 $\nu$9 | 27.5 |
| R17 | −2510.332 | D17 | 2.55 | N10 | 1.713 $\nu$10 | 53.8 |
| R18 | 135.31 | | | | | |

Front Group: R1 to R8    $f_1/f_2 = 2.846$
Rear Group: R9 to R18    $\nu_2 - \nu_1 = 17.5$
                         $D_4/D_1 = 0.3256$

Figure 5:
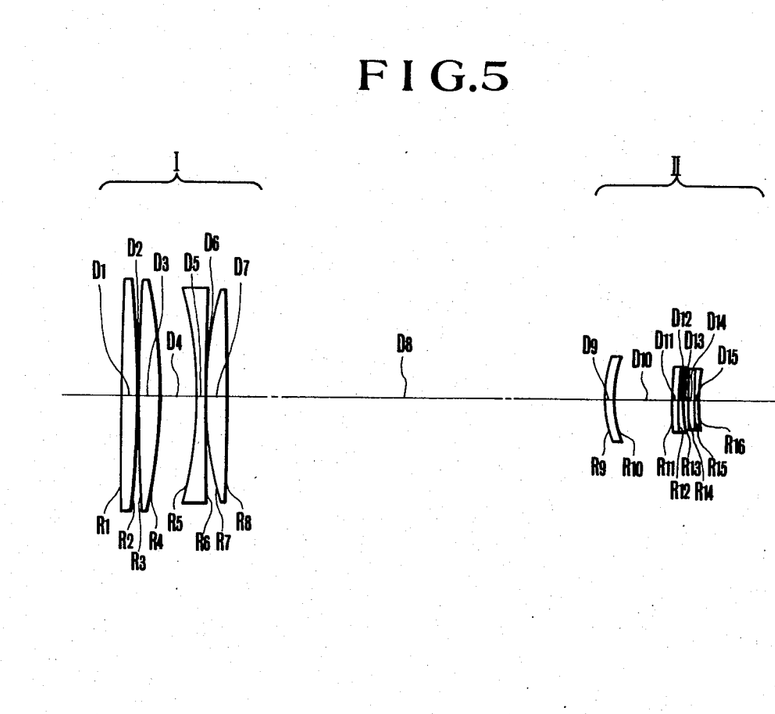
Figures 6A, 6B:
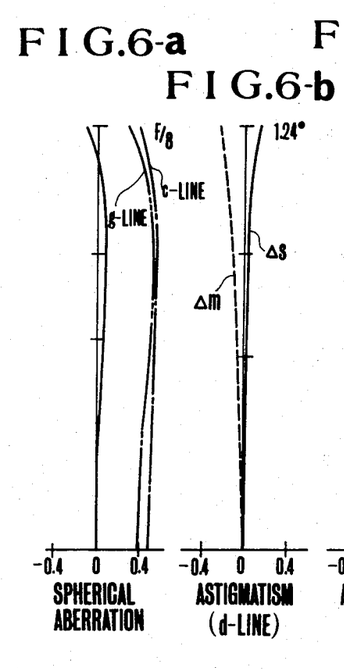
Figures 6C, 6D, 6E:
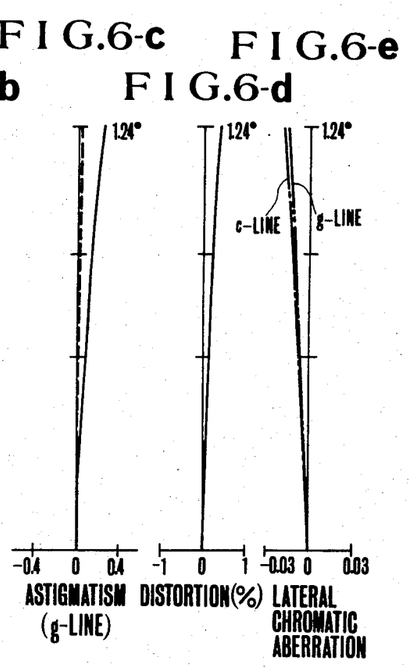
Figure 6F:
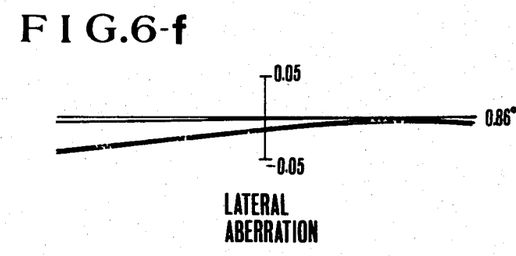

EXAMPLE 3
(FIGS. 5 and 6)

Focal Length f = 1000   F-number: F/8
Image Angle 2ω = 2.48°   Telephoto Ratio RT = 0.59

| | | | | | | |
|---|---|---|---|---|---|---|
| R1 | 2469.077 | D1 | 9.35 | N1 | 1.48749 $\nu$1 | 70.1 |
| R2 | −717.701 | D2 | 0.43 | | | |
| R3 | 679.997 | D3 | 12.76 | N2 | 1.497 $\nu$2 | 81.6 |
| R4 | −311.611 | D4 | 20.87 | | | |
| R5 | −254.711 | D5 | 5.43 | N3 | 1.7859 $\nu$3 | 44.2 |
| R6 | 1943.687 | D6 | 0.65 | | | |
| R7 | 239.661 | D7 | 12.76 | N4 | 1.497 $\nu$4 | 81.6 |
| R8 | −844.727 | D8 | 220.2 | | | |
| R9 | 71.265 | D9 | 5.1 | N5 | 1.58913 $\nu$5 | 61 |
| R10 | 63.894 | D10 | 33.53 | | | |
| R11 | 152.013 | D11 | 3.4 | N6 | 1.7552 $\nu$6 | 27.5 |
| R12 | 312.569 | D12 | 2.55 | N7 | 1.713 $\nu$7 | 53.8 |
| R13 | 103.818 | D13 | 3.4 | | | |
| R14 | 322.125 | D14 | 3.4 | N8 | 1.7552 $\nu$8 | 27.5 |
| R15 | −2738.831 | D15 | 2.55 | N9 | 1.713 $\nu$9 | 53.8 |
| R16 | 134.687 | | | | | |

-continued

| | |
|---|---|
| Focal Length f = 1000  F-number: F/8 | Telephoto Ratio RT = 0.59 |
| Image Angle 2ω = 2.48° | |

| | |
|---|---|
| Front Group: R1 to R8 | $f_1/f_2 = 2.644$ |
| Rear Group: R9 to R16 | $\nu_2 - \nu_1 = 11.5$ |
| | $D_4/D_1 = 0.335$ |

EXAMPLE 4

Figure 7:
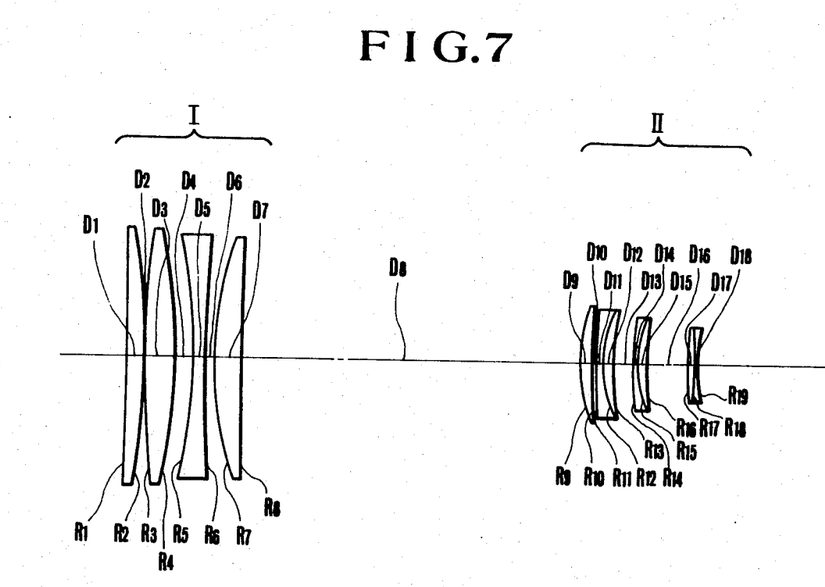
Figure 8A:
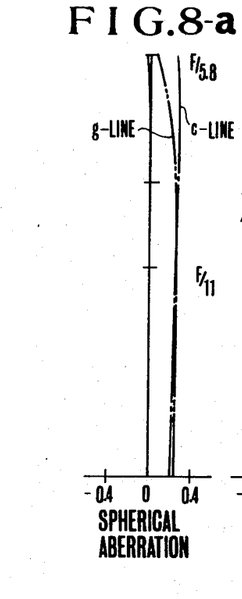
Figures 8B, 8C, 8D, 8E:
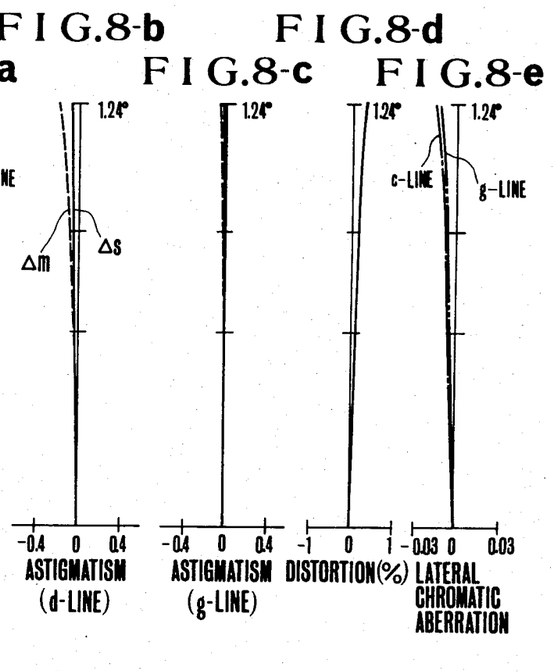
Figure 8F:
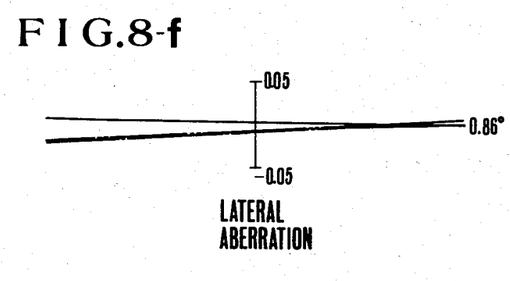

(FIGS. 7 and 8)

| | | | | | |
|---|---|---|---|---|---|
| Focal Length f = 1000  F-number: F/8 | | | | | Telephoto Ratio RT = 0.59 |
| Image Angle 2ω = 2.48° | | | | | |
| R1 | ∞ | D1 | 12.94 N1 | 1.48749 ν1 | 70.1 |
| R2 | −519.688 | D2 | 1.12 | | |
| R3 | 811.016 | D3 | 21.57 N2 | 1.49700 ν2 | 81.6 |
| R4 | −398.260 | D4 | 13.00 | | |
| R5 | −353.862 | D5 | 9.49 N3 | 1.78590 ν3 | 44.2 |
| R6 | 1949.199 | D6 | 5.69 | | |
| R7 | 260.940 | D7 | 19.41 N4 | 1.49700 ν4 | 81.6 |
| R8 | 1790.102 | D8 | 248.53 | | |
| R9 | 106.726 | D9 | 8.74 N5 | 1.51118 ν5 | 51.0 |
| R10 | 465.894 | D10 | 3.40 | | |
| R11 | 268.955 | D11 | 3.97 N6 | 1.81600 ν6 | 46.6 |
| R12 | 72.264 | D12 | 8.77 N7 | 1.50137 ν7 | 56.4 |
| R13 | 194.506 | D13 | 14.74 | | |
| R14 | 204.238 | D14 | 3.28 N8 | 1.61340 ν8 | 43.8 |
| R15 | 75.801 | D15 | 6.63 N9 | 1.59270 ν9 | 35.3 |
| R16 | 178.096 | D16 | 29.51 | | |
| R17 | 279.654 | D17 | 4.17 N10 | 1.74000 ν10 | 28.3 |
| R18 | −1790.102 | D18 | 3.02 N11 | 1.71300 ν11 | 53.8 |
| R19 | 120.436 | | | | |

| | |
|---|---|
| Front Group: R1 to R8 | $f_1/f_2 = 1.972$ |
| Rear Group: R9 to R19 | $\nu_2 - \nu_1 = 11.5$ |
| | $D_4/D_1 = 0.156$ |

EXAMPLE 5

Figure 9:
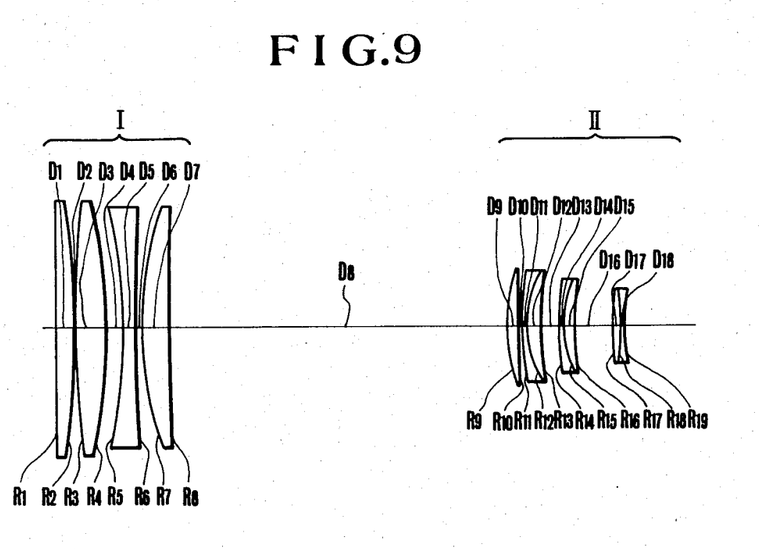
Figures 10A, 10B, 10C:
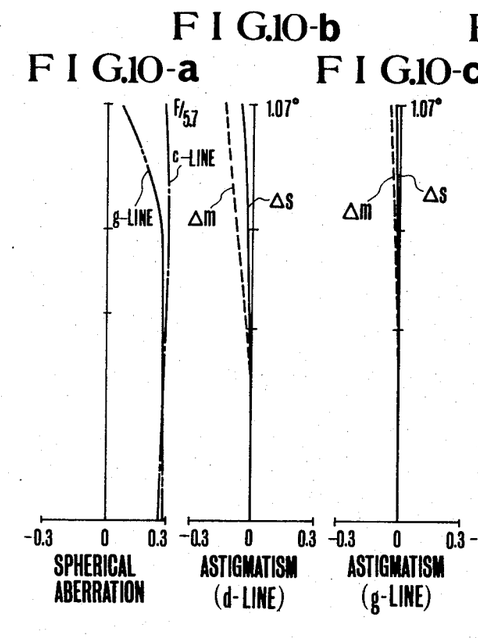
Figures 10D, 10E:
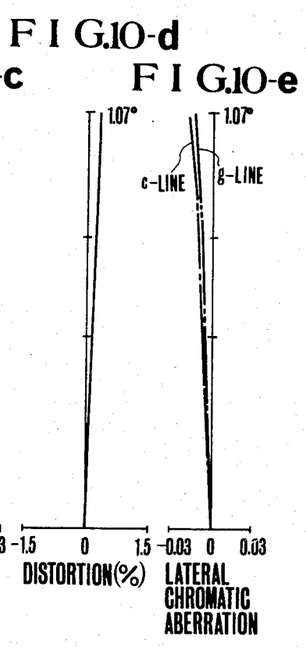
Figure 10F:
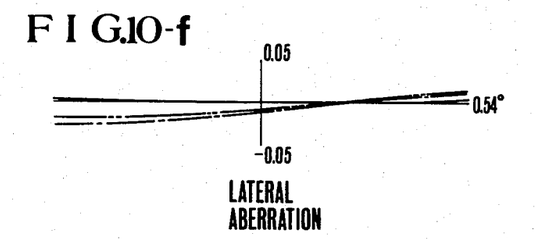

(FIGS. 9 and 10)

| | | | | | |
|---|---|---|---|---|---|
| Focal Length f = 1160  F-number: F/5.7 | | | | | Telephoto Ratio RT = 0.69 |
| Image Angle 2ω = 2.137° | | | | | |
| R1 | ∞ | D1 | 15 N1 | 1.48749 ν1 | 70.1 |
| R2 | −590.82 | D2 | 1.3 | | |
| R3 | 955.42 | D3 | 25 N2 | 1.497 ν2 | 81.6 |
| R4 | −472.61 | D4 | 17.09 | | |
| R5 | −410.14 | D5 | 11 N3 | 1.7859 ν3 | 44.2 |
| R6 | 2337.7 | D6 | 9.5 | | |
| R7 | 299.67 | D7 | 22.5 N4 | 1.497 ν4 | 81.6 |
| R8 | 2040.02 | D8 | 289.47 | | |
| R9 | 112.814 | D9 | 11.21 N5 | 1.50137 ν5 | 56.4 |
| R10 | 624.32 | D10 | 3.99 | | |
| R11 | 337.014 | D11 | 4.6 N6 | 1.816 ν6 | 46.6 |
| R12 | 78.417 | D12 | 9.77 N7 | 1.50137 ν7 | 56.4 |
| R13 | 174.397 | D13 | 14.82 | | |
| R14 | 228.58 | D14 | 3.8 N8 | 1.6134 ν8 | 43.8 |
| R15 | 82.253 | D15 | 9. N9 | 1.5927 ν9 | 35.3 |
| R16 | 255.557 | D16 | 31.77 | | |
| R17 | 323.832 | D17 | 4.84 N10 | 1.74 ν10 | 28.3 |
| R18 | −1671.06 | D18 | 3.5 N11 | 1.713 ν11 | 53.8 |
| R19 | 136.9 | | | | |

The last lens member (R17, R18, R19)
axially movable for focusing
ρR = −0.00294
ρA = −0.0004389
ρ5 = 0.003668

| | |
|---|---|
| Focal Length f = 1160  F-number: F/5.7 | Telephoto Ratio RT = 0.69 |
| Image Angle 2ω = 2.137° | |

ρ62 = 0.004453
n6 − n5 = 0.31463
n6 − n7 = 0.31463

EXAMPLE 6

Figure 11:
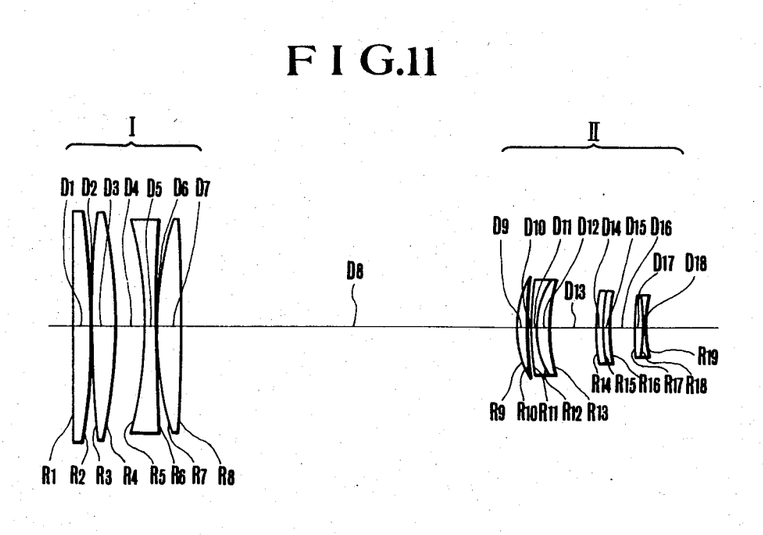
Figures 12A, 12B, 12C:
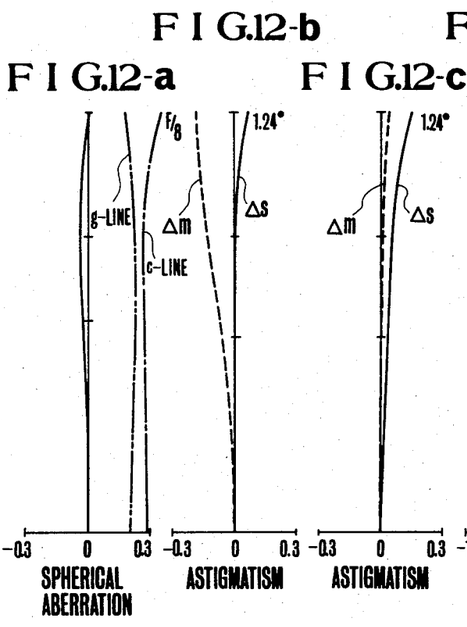
Figures 12D, 12E:
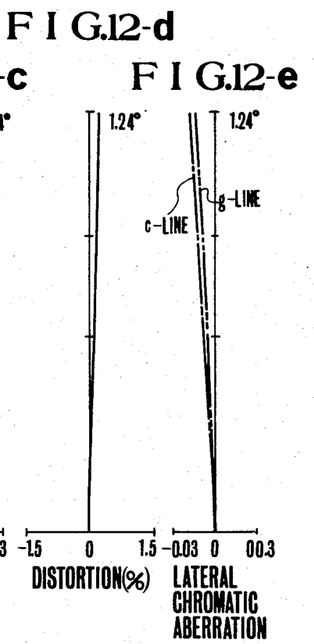
Figure 12F:
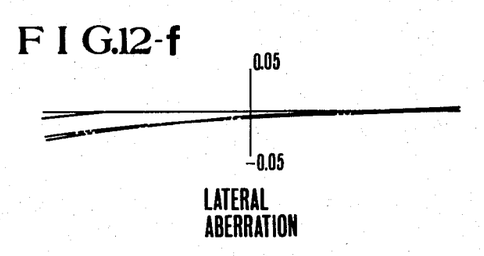

(FIGS. 11 and 12)

| | | | | | |
|---|---|---|---|---|---|
| Focal Length f = 1000  F-number: F/8 | | | | | Telephoto Ratio RT = 0.59 |
| Image Angle 2ω = 2.48° | | | | | |
| R1 | ∞ | D1 | 10.17 N1 | 1.51633 ν1 | 64.1 |
| R2 | −539.608 | D2 | 0.85 | | |
| R3 | 739.446 | D3 | 13.55 N2 | 1.497 ν2 | 81.6 |
| R4 | −296.322 | D4 | 17.17 | | |
| R5 | −244.099 | D5 | 7.2 N3 | 1.7859 ν3 | 44.2 |
| R6 | 1835.354 | D6 | 0.8 | | |
| R7 | 230.501 | D7 | 13.55 N4 | 1.497 ν4 | 81.6 |
| R8 | −865.932 | D8 | 195.83 | | |
| R9 | 66.444 | D9 | 6.27 N5 | 1.51118 ν5 | 51 |
| R10 | 250.644 | D10 | 1.57 | | |
| R11 | 190.853 | D11 | 3.39 N6 | 1.7725 ν6 | 49.6 |
| R12 | 48.203 | D12 | 6.35 N7 | 1.51454 ν7 | 54.7 |
| R13 | 81.976 | D13 | 26.74 | | |
| R14 | 103.117 | D14 | 4.02 N8 | 1.76182 ν8 | 26.5 |
| R15 | 144.59 | D15 | 2.61 N9 | 1.734 ν9 | 51.5 |
| R16 | 88.487 | D10 | 16.89 | | |
| R17 | 283.685 | D17 | 3.39 N10 | 1.76182 ν10 | 26.5 |
| R18 | −1192.869 | D18 | 2.28 N11 | 1.734 ν11 | 51.5 |
| R19 | 115.612 | | | | |

The last lens member (R17, R18, R19)
axially movable for focusing
ρR = −0.00559
ρA = −0.00122
ρ5 = 0.00572
ρ62 = −0.00752
n6 − n5 = 0.26132
n6 − n7 = 0.25796

What is claimed is:
1. A telephoto objective comprising:
a front group of positive power and a rear group of negative power;
said front group having, from front to rear, a first lens of positive power, a second lens of positive power with its convex surface towards the rear, a third lens of negative power with a concave surface towards the front, and a fourth lens of positive power with a convex surface towards the front;
letting f1 denote the focal length of said first lens, ν1 the Abbe number of the glass thereof;
f2 the focal length of said second lens, μ2 the Abbe number of the glass thereof;
D1 the axial length of said front group, and
D4 the air separation between said second lens and said third lens, the following inequalities are satisfied;

$$1.6 < \frac{f_1}{f_2} < 4.0$$

$$10 < \nu_2 - \nu_1 < 30$$

-continued $$0.1 < \frac{D4}{Dl} < 0.4;$$

the refractive power of the rear surface of said first lens being stronger than that of the front surface of the first lens.

2. A telephoto objective according to claim 1, in which the rear group has, from the object side, a first meniscus lens with its convex surface toward an object, a second meniscus lens, and a third meniscus lens, each composed of cemented elements and having a negative power with its convex surface toward the object.

3. A telephoto objective according to claim 2, in which the first meniscus lens of the second group is divided into a positive lens and a negative lens.

4. A telephoto objective according to claim 3, in which a negative lens of the dividedly arranged first meniscus lens of the second group is a cemented divergent lens with its convex surface toward the object.

5. A telephoto objective comprising:
a front group of positive power and a rear group of negative power,
said rear group having, from front to rear, a fifth lens of positive power with its convex surface towards the front,
a sixth lens of negative power and a seventh lens of positive power cemented together to form a first cemented lens,
letting $\rho R$ denote the refractive power of said rear group,
$\rho A$ the overall refractive power of said fifth lens and said cemented first lens,
$\rho 5$ the refractive power of said lens, n5 the refractive index of the glass thereof,
$\rho 62$ the refractive power of said cemented first cemented lens, and
n6 and n7 the refractive indices of the glasses of said sixth lens and said seventh lens respectively,
the following inequalities being satisfied:

$$\rho R \leq \rho A < 0$$

$$3 < \frac{\rho 5}{|\rho A|} < 10$$

$$4.5 < \frac{|\rho 62|}{|\rho A|} < 12$$

$$0.2 < n6 - n5 < 0.4$$

$$0.2 < n6 - n7 < 0.4$$

6. A telephoto objective according to claim 5, wherein said fifth lens and said cemented first lens each are of the meniscus form convex toward the front,
the cemented surface of said cemented first lens is convex toward the front and has a negative refractive power,
the air separation between the said fifth lens and said cemented first lens has an air lens of positive power.

7. A telephoto objective according to claim 5, wherein said cemented first lens is followed by at least one cemented lens C of negative power consisting of a lens A of positive power and a lens B of negative power,
letting $\nu 5$, $\nu 6$, $\nu 7$, $\nu A$ and $\nu B$ denote the Abbe numbers of the glasses of said fifth lens, sixth lens, seventh lens, lens A, and lens B, respectively, the following inequalities are satisfied:

$$0 < \nu 5 - \nu 6 < 12$$

$$0 < \nu 7 - \nu 6 < 12$$

$$5 < \nu B - \nu A < 30$$

8. A telephoto objective according to claim 7, wherein said cemented lens C is convex toward the front.

9. A telephoto objective according to claim 7, wherein said cemented lens C is two in number, the rear one being axially movable for focusing adjustment.

* * * * *